US009391502B2

(12) United States Patent
Martaeng

(10) Patent No.: US 9,391,502 B2
(45) Date of Patent: Jul. 12, 2016

(54) DEVICE AND METHOD FOR PROTECTING A BATTERY

(75) Inventor: Jesper Martaeng, Lerum (SE)

(73) Assignee: V2 Plug-In Hybrid Vehicle Partnership Handelsbolag, Gothenburg (SE)

( * ) Notice: Subject to any disclaimer, the term of this patent is extended or adjusted under 35 U.S.C. 154(b) by 825 days.

(21) Appl. No.: 13/610,124

(22) Filed: Sep. 11, 2012

(65) Prior Publication Data

US 2013/0063122 A1    Mar. 14, 2013

(30) Foreign Application Priority Data

Sep. 14, 2011    (EP) .................................... 11181237

(51) Int. Cl.
*H02J 7/00*    (2006.01)
*H02M 1/15*    (2006.01)
*B60L 11/18*    (2006.01)
*H01M 10/625*   (2014.01)
*H01M 10/615*   (2014.01)
*H01M 10/637*   (2014.01)
*H01M 10/42*    (2006.01)

(52) U.S. Cl.
CPC ............. *H02M 1/15* (2013.01); *B60L 11/1851* (2013.01); *H01M 10/615* (2015.04); *H01M 10/625* (2015.04); *H01M 10/637* (2015.04); *H02J 7/0029* (2013.01); *B60L 11/1875* (2013.01); *H01M 10/4264* (2013.01); *H01M 2220/20* (2013.01); *Y02T 10/7005* (2013.01); *Y02T 10/705* (2013.01)

(58) Field of Classification Search
CPC ................................ H02J 7/0091; H02M 1/14
USPC ..................... 320/150, 134; 363/45, 46
See application file for complete search history.

(56) References Cited

U.S. PATENT DOCUMENTS 2,899,623 A    8/1959 Lewis
4,384,321 A *  5/1983 Rippel ................ H02M 1/4225
                                                320/DIG. 31
5,343,380 A *  8/1994 Champlin ............ H02J 7/0072
                                                    320/128

(Continued)

FOREIGN PATENT DOCUMENTS

EP         0768749       4/1997
WO       2011092662       8/2011

OTHER PUBLICATIONS

International Search Report and Written Opinion from corresponding EP Application No. EP11181237.6, dated Jun. 12, 2012.

*Primary Examiner* — Richard Isla Rodas
*Assistant Examiner* — Johali Torres Ruiz
(74) *Attorney, Agent, or Firm* — Renner, Otto, Boisselle & Sklar, LLP

(57) ABSTRACT

A battery protection device for protecting a battery (1;41) comprises an electrical circuit arranged to generate or suppress a ripple current through said battery. Said electrical circuit comprises a ripple generator arranged to produce an electrical ripple current, a first ripple injector (21;48) to be arranged on a positive power line to the battery, said first ripple injector being arranged to transfer said electrical ripple current to said positive power line, and a second ripple injector (22;49) to be arranged on a negative power line to the battery. Said second ripple injector is arranged to transfer said electrical ripple current to said negative power line. Said first and second ripple injector are arranged to operate in a differential mode, e.g. opposite sign on injected current.

13 Claims, 2 Drawing Sheets

(56) References Cited

U.S. PATENT DOCUMENTS

| | | | |
|---|---|---|---|
| 5,362,942 | A | 11/1994 | Vanderslice et al. |
| 5,668,464 | A | 9/1997 | Krein et al. |
| 6,340,879 | B1 | 1/2002 | Blaecker |
| 2006/0290325 | A1 | 12/2006 | Ashtiani |
| 2009/0237044 | A1* | 9/2009 | Gjini et al. ............ 323/239 |
| 2009/0295299 | A1 | 12/2009 | Sowa |
| 2011/0115416 | A1* | 5/2011 | Oh et al. ............... 318/139 |
| 2011/0170322 | A1* | 7/2011 | Sato ............. H02J 9/062 363/40 |
| 2011/0298427 | A1* | 12/2011 | Uemura ........ B60L 11/1803 320/134 |

* cited by examiner

DEVICE AND METHOD FOR PROTECTING A BATTERY

TECHNICAL FIELD

The present invention relates to a device and method for protection for protecting a battery. It also relates to an electrical powering device comprising a battery and such a protection device.

BACKGROUND OF THE INVENTION

Nowadays, lithium batteries are used for several appliances. More and more they are used in high power applications, such as for powering electrical cars, such as battery electrical vehicles (BEVs). A lithium-ion battery can typically provide 400 V and 40 Ah.

At low cell temperatures, i.e. below approx +10° C., these lithium-ion batteries show a degraded performance and have a limited life time, due to the high impedance of the batteries and the risk of lithium plating. Therefore to protect the batteries, heating of batteries, especially in high power applications, is needed. Heating via electric dissipative elements (heaters) has been used to heat the cells directly or via the liquid or air used to thermally manage the cell temperatures. This is however not very efficient since the complete battery systems thermal mass need to heated.

Another method is to use the ripple generated by the electric motor inverter. This may not be possible due to limitations in the inverter or may create EMC (electromagnetic current) problems, nor is it possible during charging.

SUMMARY OF THE INVENTION

The object of the present invention is to increase the life time of a battery in an improved manner.

This object is achieved by a battery protection device for protecting a battery, said device comprising an electrical circuit arranged to generate or suppress a ripple current through said battery, wherein said electrical circuit comprises:
- a ripple generator arranged to produce an electrical ripple current;
- a first ripple injector to be arranged on a positive power line to the battery, said first ripple injector being arranged to transfer said electrical ripple current to said positive power line;
- a second ripple injector to be arranged on a negative power line to the battery, said second ripple injector being arranged to transfer said electrical ripple current to said negative power line, wherein said first and second ripple injector are arranged to operate in a differential mode, e.g. opposite sign on injected current.

By generating a ripple current across the battery, the internal resistance of the battery is used to heat the battery form inside. This is a very energy efficient way of heating. Heat is generated internally of the battery cells. Therefore the required heating energy and/or heating time can be reduced. By suppressing an incoming ripple, the life of the battery will increase. Furthermore, a simpler cooling system may be used as compared to the present systems. The heat generated is approximate a squared function of the current.

By averaging out peaks (i.e. ripples) via the ripple cancellation, the Root Mean Square (RMS) current will decrease, resulting in less heat generated, so the cooling demands on the cooling system are reduced.

In an embodiment, the ripple generator comprises two half bridge circuits to be powered by a power supply. Each of said half bridges may comprise two switching devices, such as MOSFETs. Other switches may be used instead. The invention is particularly useful for the protection of batteries working with Hazardous Voltages (HV), meaning batteries working in the range of 60 to 1500 VDC, more specifically in the range of 120 to 800 VDC.

In an embodiment, the ripple generator comprises a Pulse Width Modulation drive circuit arranged to produce electrical pulses. The PWM drive circuit is arranged to drive the switching devices.

In an embodiment, the protection device comprises a signal processor arranged to output a control signal to the ripple generator.

In a further embodiment, the signal processor is arranged to receive first input from a temperature sensor indicative for the temperature of the battery, and to control said PWM drive circuit using the first input.

In an embodiment, the protection device comprises a current sensor arranged to measure a current in said positive and/or negative power line, wherein said signal processor is arranged to receive a second input from the current sensor and to control said PWM drive circuit using the second input.

In an embodiment, the current sensor comprises a transformer. The advantage of using a transformer is that it will sense an AC current by way of inductive coupling, by it will not influence any DC components in the current.

In an embodiment, the first and second ripple injector each comprises at least one out of a transformer and a capacitor. These types of components are relatively easy to install and to mount. The connection can be made via non contact inductive coupling.

In an embodiment, the ripple generator is arranged to produce a reactive ripple current that is out of phase with the applied voltage across said battery. Losses (heat) can therefore be concentrated to resistive parts inside the cell. In an embodiment, the ripple generator is arranged to absorb a ripple current on the power lines and release this energy into a power source. This power source may be the normal 12 or 24V power supply of the vehicle. This will increase the overall efficiency of the vehicle. As a consequence the normal DC/DC converter from HV to 12 or 24V may be scaled down.

The invention also relates to an electrical powering device comprising a battery and a protection device as described above.

Finally, the invention relates to a method of protecting a battery, said method comprising generating or suppressing a ripple current through said battery, by means of:
- injecting a first ripple current on a positive power line to the battery;
- injecting a second ripple current on a negative power line to the battery, wherein said first and second ripple current have opposite sign.

BRIEF DESCRIPTION OF DRAWINGS

The present invention will be further described below by way of an example and with reference to the accompanying drawings.

DESCRIPTION OF EXAMPLE EMBODIMENTS OF THE INVENTION

Figure 1:
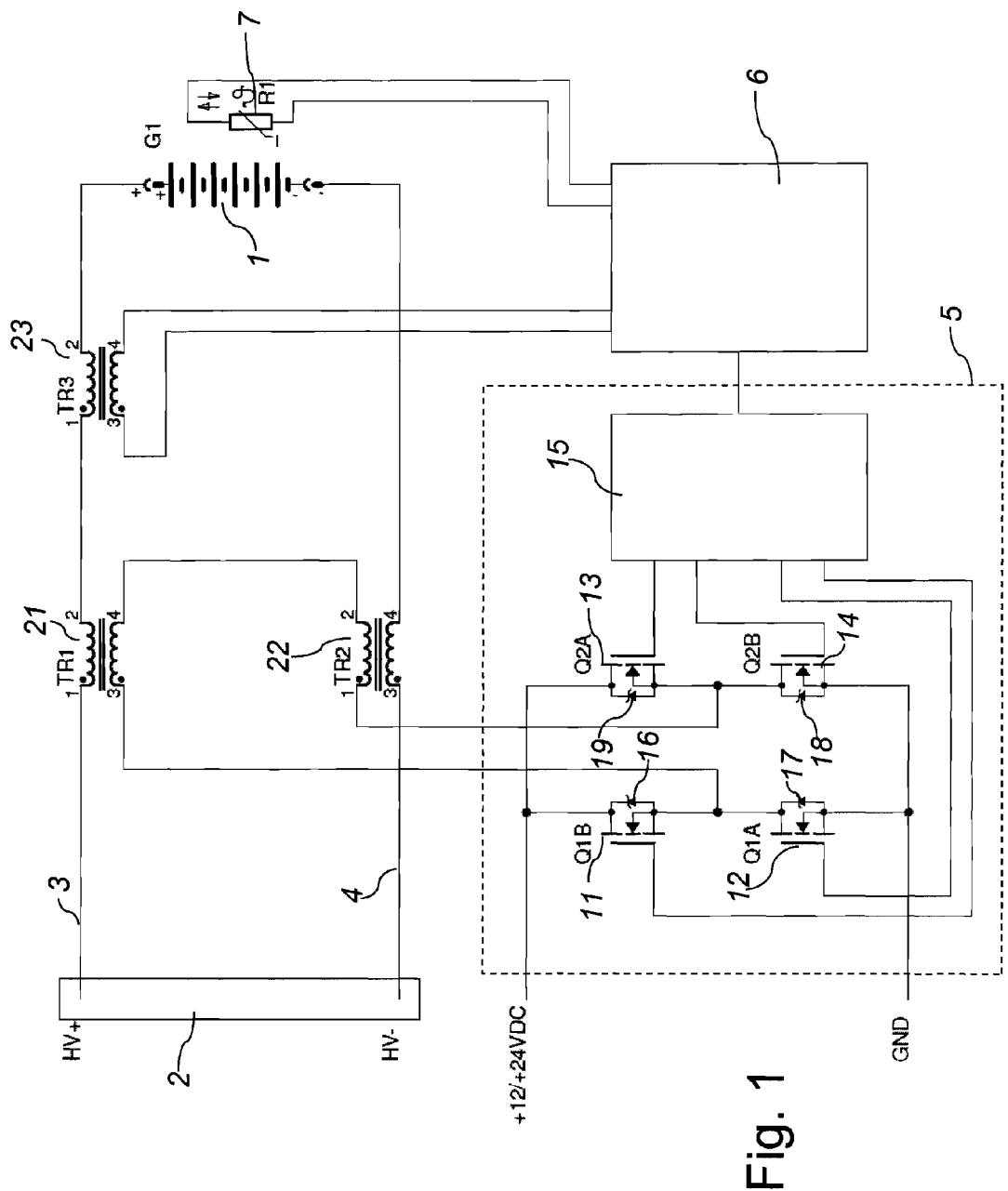
FIG. 1 is a schematic view of a first embodiment of the invention.

FIG. 1 schematically shows a battery 1 connected to a terminal unit 2 via a positive power line 3 and a negative power line 4. The battery 1 is protected against too high or too low temperatures by means of a protection device. The protection device, in an embodiment, comprises a ripple generator 5 and a digital signal processor 6 which may be connected to a temperature sensor 7 of the battery 1.

Please note that if the battery 1 does not have an appropriate sensor, a suitable temperature sensor may be added to the protection device in order to measure the temperature. This temperature sensor may for example be a temperature sensitive resistance, see R1 in FIG. 1. In this embodiment, the ripple generator 5 comprises four MOSFETs 11,12,13 and 14. The generator 5 also comprises a Pulse Width Modulation (PWM) drive circuit 15 arranged to control the MOSFETs 11,12,13,14. The four MOSFETs are arranged in two half bridges which are powered by an external 12 or 24 Volt power supply. This power supply may be the 12/24 V battery already present in a vehicle. As can be seen in FIG. 1, parallel to each MOSFET 11,12,13,14, a Zener diode 16,17,18 and 19 is connected.

The protection device in the embodiment of FIG. 1 also comprises a first ripple injector 21 being a transformer 21, and a second ripple injector 22 being a transformer 22. A connection point 21-3 of the transformer 21 is connected to a line between MOSFET 11 and MOSFET 12. A connection point 21-4 of the transformer 21 is connected to a connection point 22-2 of the transformer 22. A connection point 22-1 of the transformer 22 is connected to a line between the MOSFET 13 and the MOSFET 14.

The protection device in the embodiment of FIG. 1 also comprises a third transformer 23, typically a Rogowski-coil, used as a current sensor to measure the current through the power lines 3, 4. Connection point 23-3 and 23-4 of the transformer 23 are connected to inputs of the digital signal processor 6.

The protection device described above may operate in two primary functional modes:

Mode 1: Pure ripple injector. In this mode, a ripple current is generated by the generator 5 and applied across the battery 1. By actively applying a ripple current through the battery, an internal resistance of the battery is used to heat the battery from inside. Therefore the required heating energy and/or heating time can be reduced. Preferably, a reactive ripple current is applied to battery 1. By reactive is meant that the voltage and the current are out of phase. In that way, losses (i.e. heat) can be concentrated to resistive parts inside the battery 1 increasing the efficiency of the heating process.

Mode 2: Ripple cancellation. Also called ripple suppression. By measuring unwanted incoming ripple currents coming into the battery 1, and by injecting a current with opposing sign, the disturbance can be cancelled out. The incoming ripple is measured using for example the transformer 23, the output of which is then used by the signal processor 6 to control the PWM drive device 15. The PWM drive device 15 will create appropriate pulses so as to activate the MOSFET switches 11-14 for producing a suitable ripple. By suppressing unwanted incoming ripple, the life time of the battery can significantly be increased. The heat generated in a battery is approximate a squared function of the current. By averaging out peaks via the ripple cancellation, the RMS current will decrease, resulting in less heat generated. The cooling demands on the cooling system are reduced and thus a simpler/smaller cooling system can be used.

During normal operation of the battery 1, the battery 1 will warm up. Once a preferred operating temperature (e.g. +10° C.) has been reached, this temperature should be maintained as excessive temperature will shorten battery life. External loads and sources such as inverters and DC/DC create ripple if not sufficiently filtered. This will lead to unwanted heat generation in the battery. Due to the high power of these loads and sources passive filters may be expensive and bulky. By sensing the incoming ripple current by the current sensor 23, the ripple generator 5 can generate a current of opposing sign, thus cancelling out the ripple.

Please note that MODE 1 of the device according to an embodiment can be used any time the battery 1 needs heating, even if the HV bus is not connected. In this case heating may take power from the stored energy in the battery.

In an embodiment, the ripple generator 5 is arranged to absorb the ripple current on the power lines 3, 4 and release this energy into the power source 12 or 24V supply, thus increasing the overall efficiency of the vehicle. This will directly result in a longer driving range for a BEV. Besides, the normal DC/DC converter from HV to 12 or 24V may be scaled down. The "absorbed" energy may be set to either be released back on the power line or into the 12 or 24V supply. An offset may also be introduced creating an energy flow from the power line to the 12 or 24V supply or in the opposite direction.

The protection device may be arranged to operate in Mode 1 or in Mode 2 or in both modes at different times depending on the situation. A BMU (Battery Management Unit) or a central hybrid controller may control the modes and setting of the protection device. Please note that the pure ripple cancelation mode (i.e. mode 2) may however be autonomously activated.

The device according to the invention is easy to install and mount. Especially in the case when the connections onto the power lines is made via non contact inductive coupling. The device may be powered from normal power source e.g. 12 or 24 VDC supply which is already present in most vehicles. Due to its relatively simple electronic components, the production costs of the device are relatively low.

Figure 2:
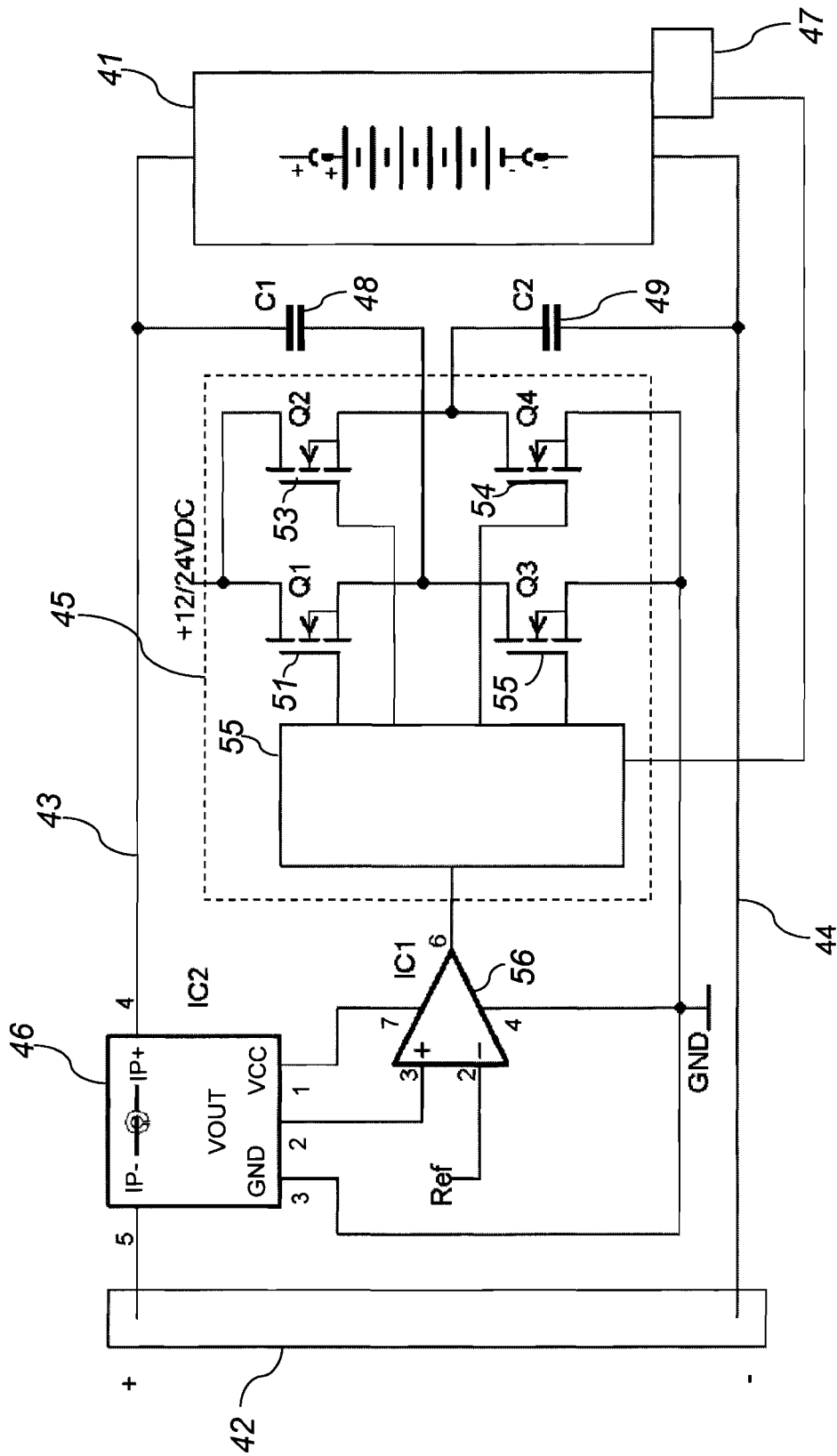
FIG. 2 is a schematic view of a second embodiment of the invention.

FIG. 2 schematically shows a second embodiment of the invention. A battery 41 is connected to a terminal unit 42 via a positive power line 43 and a negative power line 44. Furthermore, a protection device is shown which comprises a ripple generator 45, a current sensor 46 and a temperature sensor 47. The temperature sensor 47 may instead be part of the battery 41. The protection device further comprises two ripple injectors 48, 49 and connected on the positive power line 43 and the negative power line 44, respectively. These injectors 48, 49 are made of capacitors 48, 49 that to transfer energy between LV (Low voltage) and HV (Hazardous Voltage) circuit. As in the embodiment of FIG. 1, the LV circuit comprises two half bridge circuits connected to a power supply of 12 or 24V, not shown. A first bridge circuit comprises two MOSFETs 51, 52 and a second bridge circuit comprises two MOSFETs 53, 54. Each of the capacitors is connected to one of the bridge circuit.

The two capacitors 48, 49 are electrically connected together in a differential mode, e.g. opposite sign on injected current. The ripple generator also comprises a logic and driver module 55, which may comprise a PWM drive circuit and a signal processor as described above with reference to FIG. 1. Furthermore, an amplifier 56 is present arranged between the AC current sensor 46 and the logic and driver module 55. The AC current sensor 46 measures the current into the battery 41. The sensed AC current is amplified by the amplifier 56 and processed in the logic and driver module 55. Depending on the required operating mode of the invention, the reference REF input signal of the amplifier 56 is either a sine wave in MODE 1 or zero in MODE 2. The calculated error signal is then feed to a PWM drive circuit of the module 55 that drives the transistors 51-54 according to the requested operation.

As in the case of the transformers 21, 22, the capacitors 48, 49 act as voltage isolators onto the battery supply. Since the LV circuit is very efficient and galvanically isolated from the battery voltage, it may be powered from a standard vehicle power +12 or +24V DC supply.

Above, it is mentioned that the ripple generator generates a ripple current. It should be clear for the skilled person that this can be a sinus AC current, or at least close to a sinus current. Depending on the battery characteristics the circuit may need to change frequency. The impedance of the battery varies with frequency, the SOC, temperature and age of the battery. The frequency preferably is chosen so the best heating performance is obtained. This may either be measured during battery characterization and stored in an look-up table, or it may be calculated during operation via an optimization algorithm.

Although the present invention has been illustrated and described with reference to the preferred embodiments of the present invention, those ordinary skilled in the art shall appreciate that various modifications in form and detail may be made without departing from the spirit and scope of the invention. It is further noted that the invention is not restricted to the protection of lithium batteries, but that also other types of batteries may be used.

The invention claimed is:

1. A battery protection device for protecting a battery, said device comprising an electrical circuit arranged to generate or suppress a ripple current through said battery, wherein said electrical circuit comprises:
   a ripple generator arranged to produce an electrical ripple current;
   a first ripple injector to be arranged on a positive power line to the battery, said first ripple injector being arranged to transfer said electrical ripple current to said positive power line;
   a second ripple injector to be arranged on a negative power line to the battery, said second ripple injector being arranged to transfer said electrical ripple current to said negative power line,
   wherein each of said first and second ripple injectors is a transformer or a capacitor, said first and second injectors being arranged to operate in a differential mode,
   said battery protection device being arranged to operate in two modes, said modes being:
      a ripple injector mode in which a ripple current is generated by said electric circuit and applied across said battery; and
      a ripple suppression mode in which unwanted incoming ripple currents coming into said battery are measured, and a current with opposing sign is injected in said battery; and
   a Battery Management Unit or a central hybrid controller arranged to control in which of the two modes the battery protection device operates and further to control settings of the protection device.

2. The device according to claim 1, wherein said ripple generator comprises two half bridge circuits to be powered by a power supply.

3. The device according to claim 2, wherein each of said half bridges comprises two switching devices.

4. The device according to claim 3, wherein ripple generator comprises a Pulse Width Modulation drive circuit arranged to produce electrical pulses, said PWM drive circuit being arranged to drive the switching devices.

5. The device according claim 1, wherein said protection device comprises a signal processor arranged to output a control signal to said ripple generator.

6. The device according to claim 5, wherein said signal processor is arranged to receive a first input from a temperature sensor indicative for the temperature of the battery and to control said PWM drive circuit using said first input.

7. The device according to claim 6, wherein said protection device comprises a current sensor arranged to measure a current in at least one of said positive or negative power lines, wherein said signal processor is arrange to receive a second input from said current sensor and to control said PWM drive circuit using said second input.

8. The device according to claim 7, wherein said current sensor comprises a transformer.

9. The device according to claim 1, wherein said ripple generator is arranged to produce a reactive ripple current that is out of phase with the applied voltage across said battery.

10. The device according to claim 1, wherein said ripple generator is arranged to absorb a ripple current on the power lines and release this energy into a power source.

11. An electrical powering device comprising a battery and a protection device according to claim 1.

12. The device according to claim 1, wherein the differential mode includes opposite sign on injected current.

13. A method of protecting a battery, said method comprising a battery protection device generating or suppressing a ripple current through said battery, by:
   injecting a first ripple current on a positive power line to the battery via a first transformer or a first capacitor;
   injecting a second ripple current on a negative power line to the battery via a second transformer or a second capacitor,
   wherein said first and second ripple current have opposite sign, said method further comprising:
   operating in two modes, said modes including:
      a ripple injector mode in which a ripple current is generated by an electric circuit and applied across said battery; and
      a ripple suppression mode in which unwanted incoming ripple currents coming into said battery are measured, and a current with opposing sign is injected in said battery;
   controlling in which of the two modes the battery protection device operates; and
   controlling settings of the battery protection device.

* * * * *